United States Patent
Rek

(10) Patent No.: US 6,597,926 B1
(45) Date of Patent: Jul. 22, 2003

(54) ANTENNA-GAIN DIVERSITY

(75) Inventor: Leo Rek, Neuvillalais (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/257,635

(22) Filed: Feb. 25, 1999

(30) Foreign Application Priority Data

Feb. 27, 1998 (EP) .............................................. 98400481

(51) Int. Cl.[7] .............................. H04B 1/38; H04M 1/00
(52) U.S. Cl. ...................... 455/562; 455/78; 455/277.1; 455/97
(58) Field of Search .......................... 455/562, 78, 82, 455/277.1, 279.1, 276.1, 97, 550, 553, 121, 123, 552

(56) References Cited

U.S. PATENT DOCUMENTS

| 5,548,837 A | | 8/1996 | Hess et al. .................... 455/278 |
| 5,905,467 A | * | 5/1999 | Narayanaswamy et al. . 343/702 |
| 5,913,153 A | * | 6/1999 | Nakamoto et al. ............. 455/78 |
| 5,991,643 A | * | 11/1999 | Chao-Cheng ................ 455/562 |
| 6,006,117 A | * | 12/1999 | Hageltorn et al. ........... 455/575 |
| 6,072,993 A | * | 6/2000 | Trikha et al. ................. 455/78 |

* cited by examiner

Primary Examiner—Vivian Chin
Assistant Examiner—John J Lee
(74) Attorney, Agent, or Firm—Dicran Halajian

(57) ABSTRACT

Antenna-gain diversity is obtained in the following manner. A first and a second antenna element (A1,A2) are electromagnetically coupled. A switchable antenna-coupler (SAC) is switchable between:

a first antenna-coupling state (S1) in which the first and the second antenna element (A1,A2) are electrically coupled to an antenna-signal node (N); and a second antenna-coupling state (S2) in which the first antenna element (A1) is electrically coupled to the antenna-signal node (N) and the second antenna element (A2) is electrically coupled to signal ground (GND).

This type of antenna-gain diversity is particularly suitable for use in an application which needs to be relatively small in size or relatively inexpensive, or both, such as a cordless telephone, for example.

5 Claims, 3 Drawing Sheets

ANTENNA-GAIN DIVERSITY

FIELD OF THE INVENTION

The invention relates to antenna-gain diversity. Antenna-gain diversity is the provision of at least two different antenna patterns.

BACKGROUND OF THE INVENTION

U.S. Pat. No. 5,548,837 describes a receiver that includes a first and second antenna element being characterized by a first and second antenna pattern, respectively. Together, the first and second antenna pattern produce a composite antenna pattern. To provide diversity gain of a signal received, the following is proposed. Each of the signals received by the first and second antenna element, respectively, is adjusted in amplitude. The amplitude-adjusted signals are combined, such that the composite antenna pattern is effectively rotated.

SUMMARY OF THE INVENTION

It is an object of the invention to provide antenna-gain diversity which is better suited for an application which needs to be relatively small in size or relatively inexpensive, or both.

The invention takes the following aspects into consideration. An antenna element which provides gain in one or more specific directions is relatively spacious and costly. The background-art technique of antenna-gain diversity requires two such antenna elements. Consequently, the background-art technique of antenna-gain diversity will not be suited for low-cost applications, for example, in the field of consumer electronics. The background art technique will also not be suited for small-size applications such as, for example, cordless telephones.

In accordance with the invention, a first and a second antenna element are electro-magnetically coupled, and a switchable antenna-coupler is switchable between:

a first antenna-coupling state in which the first and the second antenna element are electrically coupled to an antenna-signal node; and a second antenna-coupling state in which the first antenna element is electrically coupled to the antenna-signal node and the second antenna element is electrically coupled to signal ground.

In the invention, a different antenna pattern is obtained for each antenna-coupling state. To this effect, it is not necessary that the antenna elements provide gain in one or more specific directions. For example, in the invention, the antenna elements may have an omni-directional diagram. An omni-directional antenna element is relatively small and can be manufactured at relatively low cost. Since, in the invention, omni-directional antenna elements can be used, whereas this is not possible in the background art, antenna-gain diversity in accordance with the invention is better suited for an application which needs to be relatively small in size or relatively inexpensive, or both, such as a cordless telephone, for example.

Another advantage of the invention relates to the following aspect. In the invention, the switchable antenna-coupler switches between two antenna-coupling states, whereas in the background art, an antenna coupler carries out amplitude adjustments. Switching is a relatively simple function, whereas adjusting amplitudes is a relatively complicated function. An antenna coupler will generally have better signal-handling properties if it carries out a relatively simple function than if it carries out a relatively complicated function. Consequently, the switchable antenna coupler, which is used in the invention, will generally have better signal-handling properties than the antenna coupler which is used in the background art. In a wireless-communication apparatus, which comprises an antenna coupler, the signal-handling properties of the antenna coupler substantially influence one or more performance aspects of the wireless-communication apparatus. Consequently, the invention allows a wireless-communication apparatus having a better performance as compared to the background art.

The invention and additional features, which may be optionally used to implement the invention to advantage, are apparent from and will be elucidated with reference to the drawings described hereinafter.

DETAILED DESCRIPTION OF THE INVENTION

First, some remarks will be made on the use of reference signs. Similar entities are denoted by an identical letter code throughout the drawings. In a single drawing, various similar entities may be shown. In that case, a numeral is added to the letter code to distinguish similar entities from each other. The numeral will be between parentheses if the number of similar entities is a running parameter. In the description and the claims, any numeral in a reference sign may be omitted if this is appropriate.

Figure 1:
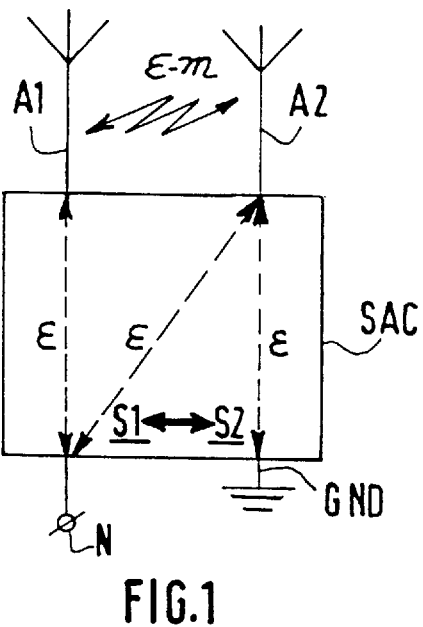
FIG. 1 is a conceptual diagram illustrating basic features of the invention as claimed in claim 1.

FIG. 1 illustrates basic features of the invention in full lines. A first and a second antenna element A1, A2 are electro-magnetically coupled. A switchable antenna-coupler SAC can be switched between two antenna-coupling states S1,S2. In the first antenna-coupling state S1, the first and the second antenna element A1,A2 are electrically coupled to an antenna-signal node N. In the second antenna-coupling state S2, the first antenna element A1 is electrically coupled to the antenna-signal node N, whereas the second antenna element A2 is electrically coupled to signal ground GND.

The basic features illustrated in FIG. 1 provide the following effects. It is assumed that a transmitter signal is supplied to the antenna-signal node N. In either coupling state S1 or S2, the first antenna element A1 will radiate at least a portion of the transmitter signal because the antenna-signal node N is electrically coupled to the first antenna element A1. In either coupling state S1 or S2, the second antenna element A2 will also radiate a portion of the transmitter signal but in different ways. In the first antenna-coupling state S1, the second antenna element A2 will radiate a portion of the transmitter signal because the antenna-signal node N is electrically coupled to the second antenna element A2. In the second antenna-coupling state S2, the second antenna element A2 will also radiate a portion of the transmitter signal but in an indirect way. The second antenna element A2 picks up a portion of the transmission signal which is radiated by the first antenna element A1, and re-radiates this portion because it is electrically coupled to signal ground GND.

The effects described hereinbefore may be summarized as follows. In the first antenna coupling state S1, the first and the second antenna element A1,A2 are active radiators. In the second coupling state S2, the first antenna element A1 is an active radiator, whereas the second antenna element A2 is a passive radiator.

An antenna pattern which is obtained depends, amongst other things, on the relation in terms of phase and amplitude between signals in the first and the second antenna element A1,A2. The relationship between these signals will be different in the first and the second antenna-coupling state S1,S2, respectively, because the second antenna element A2 is an active radiator in the first antenna-coupling state S1, whereas it is a passive radiator in the second antenna-coupling state S2. Consequently, the antenna pattern which is obtained in the first antenna-coupling state S1 will be different from the antenna pattern which is obtained in the second antenna-coupling state S2. This also applies in the case of reception for which the antenna patterns are identical to those in the case of transmission as described hereinbefore by way of example.

Figure 2:
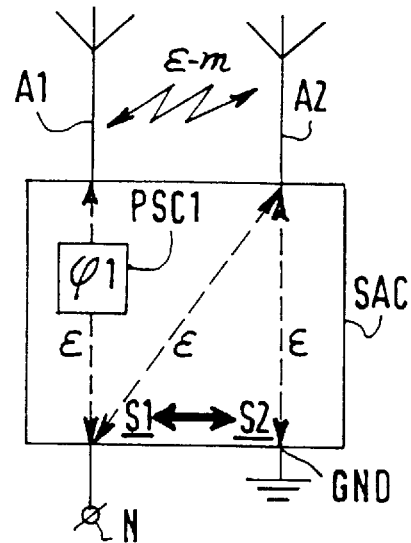
FIGS. 2 to 5 are conceptual diagrams illustrating additional features as claimed in claims 2 to 5, respectively.

FIG. 2 illustrates the following feature in addition to the features which have been discussed with reference to FIG. 1. A phase-shifting circuit PSC1 provides a phase shift $\phi 1$ between the first antenna-element A1 and the antenna signal node N.

Figure 3:
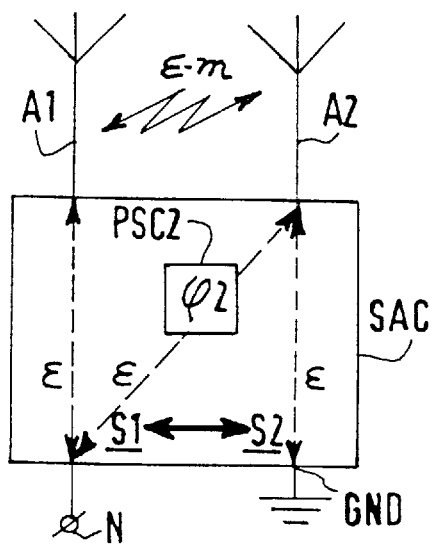

FIG. 3 illustrates the following feature in addition to the features which have been discussed with reference to FIG. 1. A phase-shifting circuit PSC2 provides, in the first antenna-coupling state S1, a phase shift ($\phi 2$ between the second antenna element A2 and the antenna-signal node N.

Figure 4:
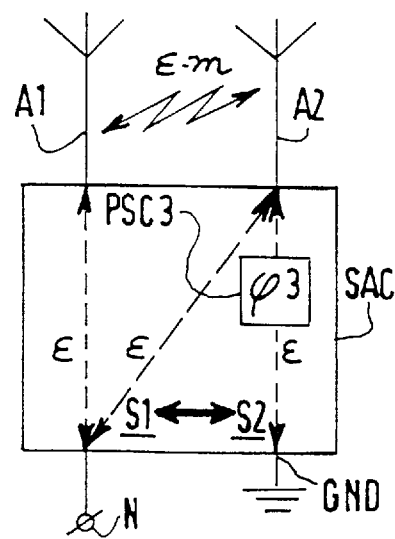

FIG. 4 illustrates the following feature in addition to the features which have been discussed with reference to FIG. 1. A phase-shifting circuit PSC3 provides, in the second antenna-coupling state S2, a phase shift ($\phi 3$ between the second antenna element A2 and signal ground GND.

With regard to the features illustrated in FIGS. 2, 3 and 4, the following aspects have been taken into consideration. It is possible to adjust the antenna pattern which is obtained by varying the distance between the first and the second antenna element A1,A2. Generally, there will be certain constraints as to where antenna elements can be located in a wireless-communication apparatus, for example, for ergonomic reasons or aesthetics reasons, or both. Consequently, it will not always be possible to have a particular distance between the antenna elements.

Any of the features illustrated in FIGS. 2, 3 and 4 provides the following advantageous effects. Any of the phase-shifting circuits PSC1, PSC2 or PSC3 influences the phase relation between signals in the first and the second antenna element A1,A2, respectively, in at least one antenna-coupling state S1,S2. It has previously been explained that the antenna pattern which is obtained depends on the phase relation between these signals. Consequently, any of the phase-shifting networks PSC1, PSC2 or PSC3 influences the antenna pattern which is obtained in at least one antenna-coupling state S1,S2. Thus, even if there are certain constraints as to where the antenna elements can be located, it will be possible to obtain satisfactory antenna patterns by applying one or more of the features illustrated in FIGS. 2, 3 and 4. Thus, any of the features illustrated in FIG. 2, 3 or 4 contributes to the variety of applications for which satisfactory antenna-gain diversity can be obtained.

More specifically, in FIG. 2, the phase-shifting circuit PSC1 influences the phase relation between the signals in the first and the second antenna element A1,A2, respectively, in both the first and second antenna-coupling states S1,S2. Consequently, the phase-shifting circuit PSC1 will influence the antenna pattern which is obtained in the first antenna-coupling state S1 and the antenna pattern which is obtained in the second antenna-coupling state S2. In FIG. 3, the phase-shifting circuit PSC2 influences the phase relation between the signals in the first and the second antenna element A1,A2 in the first coupling state S1 only and, consequently, it will influence the antenna pattern which is obtained in the first coupling state S1 only. In FIG. 4, the phase-shifting circuit PCS3 influences the phase relation between the signals in the first and the second antenna elements A1,A2 in the second antenna-coupling state S2 only and, consequently, it will influence the antenna pattern which is obtained in the second coupling state S2 only.

With regard to a combination of the features illustrated in FIGS. 2 and 3, the following aspects have been taken into consideration. Each antenna element A1,A2 may be electrically represented as a load impedance between the antenna-signal node N and signal ground GND. It is assumed that a transmitter signal is supplied to the antenna-signal node N. The relation between the values of the load impedances will determine which percentage of the transmitter signal will flow to the first and the second antenna element A1,A2, respectively. Consequently, the relation between the values of the load impedances will influence the amplitude relation between signals in the first and the second antenna element A1,A2, respectively.

The combination of the features illustrated in FIGS. 2 and 3 provides the following advantageous effects. The phase-shifting circuits PSC1 and PCS2 influence the value of a first and a second load impedance being an electrical representation of the first and the second antenna element A1,A2, respectively. As explained hereinbefore, the relation between the values of these load impedances influences the amplitude relation between signals in the first and the second antenna element A1,A2, respectively. Consequently, the phase-shifting circuits PSC1 and PSC2 influence the amplitude relation between signals in the first and the second load antenna element, A1,A2, respectively, in addition to the phase relation between these signals. Since both the amplitude and phase relation influence the antenna pattern which is obtained, the combination of the features illustrated in FIGS. 2 and 3 provides an additional degree of freedom to obtain a satisfactory result.

Figure 5:
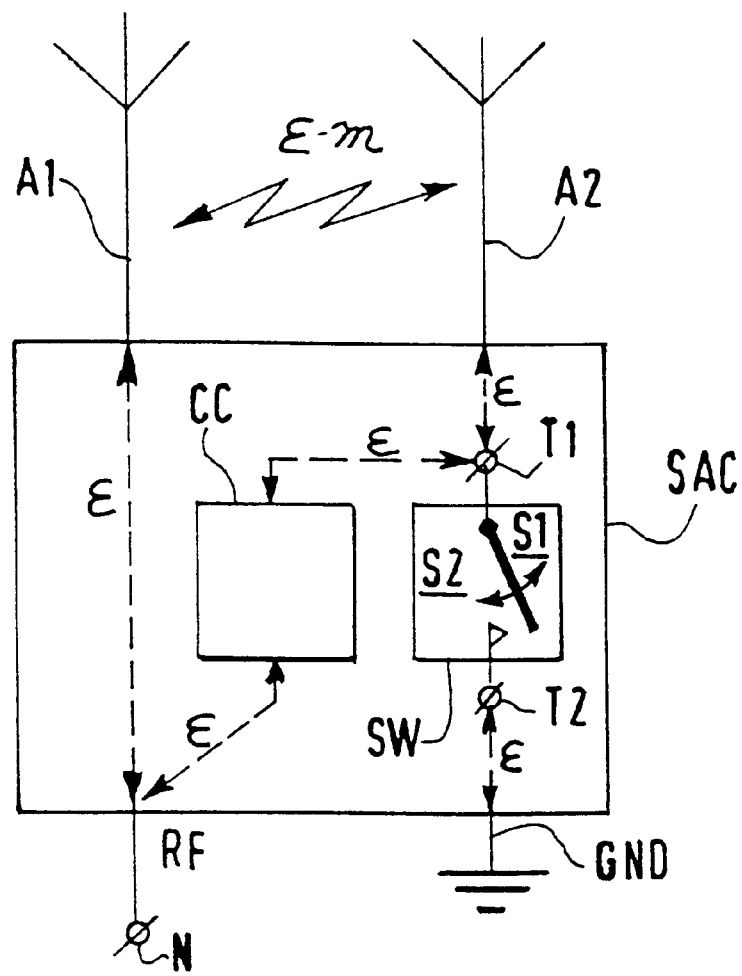

FIG. 5 illustrates the following features in addition to the features which have been discussed with reference to FIG. 1. The switchable-antenna coupler SAC comprises a switch SW which has a first and a second terminal T1,T2. The first terminal T1 is electrically coupled to the second antenna element A2 and the antenna-signal node N. The second terminal T2 is electrically coupled to signal ground GND. A coupling circuit CC between the antenna-signal node N and the first terminal T1 of the switch SW prevents a signal RF, which may be present at the antenna-signal node N, from substantially flowing to signal ground GND via the switch SW. It goes without saying that the first antenna-coupling state S1 is obtained when the switch SW is open and that the second antenna-coupling state S2 is obtained when the switch SW is closed.

With regard to the FIG. 5 features, the following aspects have been taken into consideration. It is difficult and hence costly to realize a switch which, in a closed state, passes a high-frequency signal with relatively little attenuation or distortion of the high-frequency signal, or both. It is generally less difficult and hence less costly to provide a relatively high impedance at a certain point in order to prevent a high-frequency signal at that point from flowing to signal ground. For example, at the point of interest, an additional reactance may be provided which forms a resonant circuit with other reactances.

The FIG. 5 features provide the following advantageous effects. It is assumed that a transmitter signal RF is supplied to the antenna-signal node N. If the switch SW is open, a portion of the transmitter signal RF flows to the second antenna element A2 without passing through switch SW. If the switch SW is closed, the coupling circuit CC substantially prevents the transmission signal RF from flowing to signal ground GND via the switch SW. The antenna element A1 radiates the transmission signal RF and the second antenna element A2 picks up a portion of the transmission signal RF. This portion of the transmission signal RF flows to signal ground GND via the switch SW and, as a result, it is re-radiated. Since this portion of the transmission signal RF is relatively small, the signal-handling properties of the switch SW, in terms of attenuation and distortion, will affect the quality of the combination of the radiated and the re-radiated transmission signal to a relatively small degree only. Consequently, the requirements which the switch SW needs to meet in order to obtain a satisfactory quality are relatively relaxed. Consequently, the FIG. 5 feature allows the use of a relatively inexpensive switch SW and thereby contributes to providing antenna-gain diversity at moderate cost.

Figure 6:
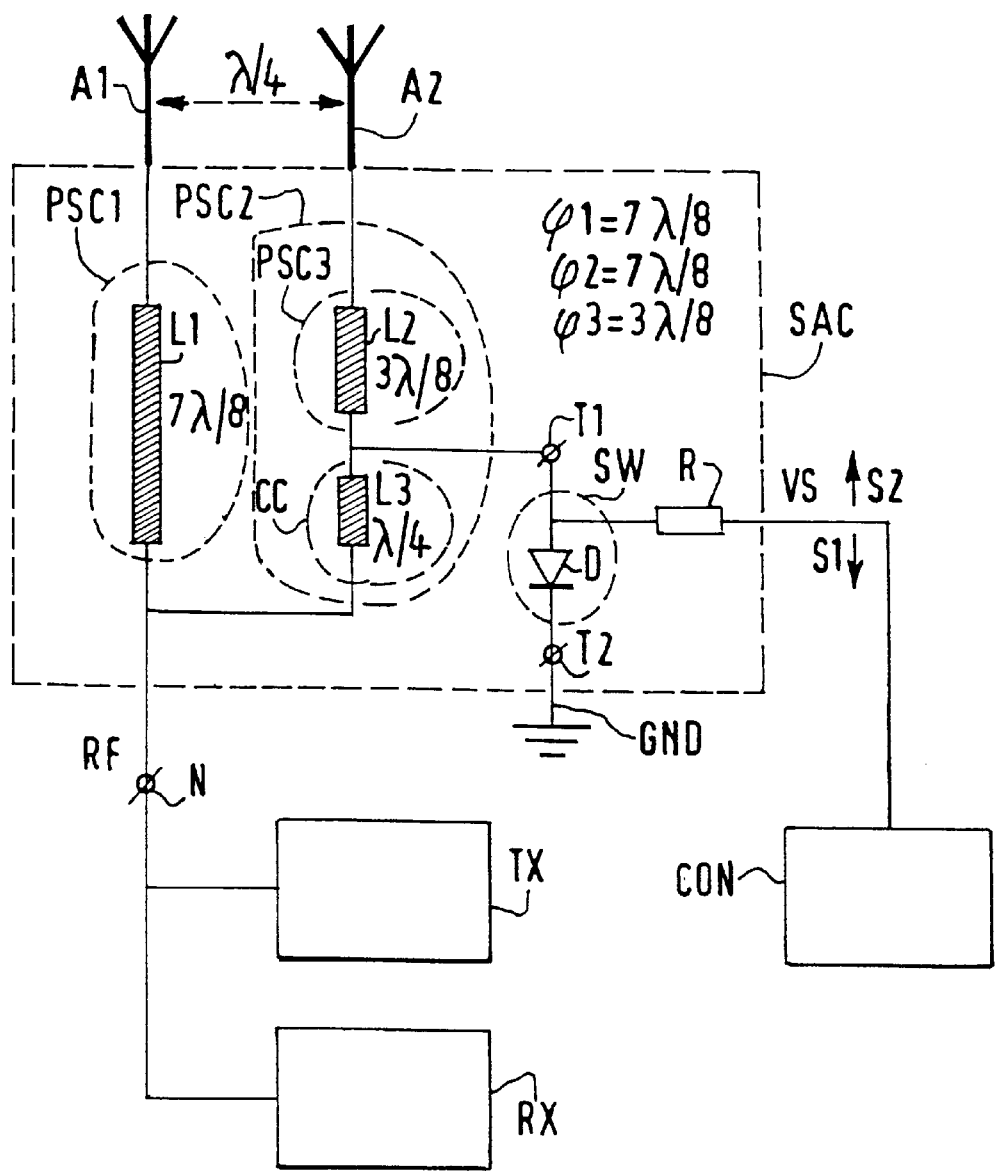
FIG. 6 is a block diagram of an example of a wireless-communication apparatus in accordance with the invention.

FIG. 6 shows an example of a wireless-communication apparatus which includes the features described hereinbefore with reference to FIGS. 1, 2, 3, 4, and 5. The wireless-communication apparatus can transmit or receive signals having a wavelength λ. To that end, it comprises a receiver circuit RX and a transmitter circuit TX. Both these circuits are coupled to the antenna-signal node N.

In the FIG. 6 wireless-communication apparatus, the distance L between first and second antenna element A1,A2 is substantially a quarter of the wavelength 1λ/4. The switch SW is in the form of a pin diode D. The pin diode D receives a control voltage VS from a controller CON via a signal-blocking impedance R. The phase-shifting circuits PSC are formed by transmission lines L. More specifically, the phase-shifting circuit PSC1 is formed by a transmission line L1 having a length which is seven eighths of the wavelength 7λ/8. The phase-shifting circuit PSC2 is formed by a combination of a transmission line L2 and a transmission line L3 having a length of a quarter of the wavelength 1λ/4 and three eighths of the wavelength 3λ/8. The phase-shifting circuit PSC3 is formed by the transmission line L3. The coupling circuit CC is formed by the transmission line L2.

The FIG. 6 wireless-communication apparatus operates in the following manner. It is assumed that the receiver circuit TX supplies a transmission signal RF to the antenna-signal node N. It is also assumed that each antenna element A1,A2 as such has an antenna pattern which is substantially omnidirectional.

In the first antenna-coupling state S1, the control voltage VS has a relatively low value such that the pin diode D does not conduct. The first antenna element A1 receives a portion of the transmission signal RF via the transmission line L1 which shifts this portion of the transmission signal in phase by seven-eighths of the wavelength 7λ/8. The second antenna element A2 receives another portion of the transmission signal RF via transmission lines L2 and L3 which, together, shift this portion of the transmission signal RF by seven-eighths of a wavelength 7λ/8 also. As a result, signals in the first and the second antenna element A1 and A2, respectively, are in phase. The antenna pattern which is obtained has maximum gain in either two directions perpendicular to an imaginary line which interconnects the first and the second antenna element A1, A2, for example in a north and a south direction.

In the second antenna-coupling state S2, the control voltage VS is relatively high, such that the pin diode D is conducting. The pin diode D is virtually a short circuit between a coupling of the transmission lines L2 and L3 and signal ground GND. The transmission line L2 transforms this short circuit to an open circuit at the antenna-signal node N, because the transmission line L2 provides a phase shift of a quarter of the wavelength 1λ/4. Accordingly, the first antenna element A1 will substantially receive the entire transmission signal RF which the transmitter circuit TX supplies to the antenna-signal node N. The transmission line L3 transforms the short circuit caused by the pin diode D to an imaginary impedance seen at the end of the transmission line L3 which is coupled to the second antenna element A2. Accordingly, the second antenna element A2 will be electrically coupled to signal ground via this imaginary impedance. The transmission line L3 provides a phase shift of three eighths of the wavelength 3λ/8 which determines the value of imaginary impedance and thereby the antenna pattern obtained. The antenna pattern which is obtained has maximum gain in either two directions coinciding with an imaginary line between the first and the second antenna element A1,A2, for example in an east and a west direction.

Thus, the FIG. 6 wireless-communication apparatus has antenna-gain diversity in the form of two substantially symmetrical antenna patterns which are rotated 90 degrees with respect to each other.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this by no means excludes the fact that some functional elements, or all functional elements, may be implemented as a single physical unit.

Although, in FIG. 6, the phase-shifting circuits PSC are in the form of transmission lines L, other implementations are by no means excluded. For example, the phase-shifting circuits PSC may also be implemented using inductances and capacitances. All that matters is that the phase-shifting circuits PSC, some of which may be optionally applied, influence the phase relation between signals in the first and the second antenna element A1,A2, respectively, either in the first antenna-coupling state S1 or in the second antenna-coupling state S2, or in both states.

Although, in FIG. 6, the coupling circuit CC is in the form of a transmission line of a quarter of the wavelength 1/4λ, other implementations are by no means excluded. For example, the coupling circuit CC may be an impedance-transformation circuit with inductances or capacitances, or both, the impedance-transformation circuit transforming a short circuit between the second antenna element A2 and signal ground into an open circuit between the antenna-signal node N and signal ground. All that matters is that the coupling circuit CC, which may be optionally applied together with the other additional features illustrated in FIG. 5, substantially prevents a signal which may be present at the antenna-signal node N from flowing through signal ground GND via the switch SW.

In the claims, any reference sign between parentheses shall not be construed as limiting the claim concerned.

What is claimed is:

1. A wireless-communication apparatus with antenna-gain diversity, the wireless-communication apparatus comprising:
   a first and a second antenna element which are electromagnetically coupled; and
   a switchable antenna-coupler having:
   a first antenna-coupling state in which the first and the second antenna element are electrically coupled to an antenna-signal node;
   a second antenna-coupling state in which the first antenna element is electrically coupled to the antenna-signal node and the second antenna element is electrically coupled to signal ground; and
   a switch having a first and a second terminal, the first terminal being electrically coupled to the second antenna element and the antenna-signal node, the second terminal being electrically coupled to the signal ground;
   a coupling circuit between the antenna-signal node and the first terminal of the switch for preventing a signal, which may be present at the antenna-signal node, from substantially flowing to the signal ground via the switch.

2. The wireless-communication apparatus as claimed in claim 1, wherein the switchable antenna-coupler further comprises a phase-shifting circuit for providing a phase shift between the first antenna-element and the antenna signal node.

3. The wireless-communication apparatus as claimed in claim 1, wherein the switchable antenna-coupler further comprises a phase shifting circuit for providing, in the first antenna-coupling state, a phase shift between the second antenna-element and the antenna signal node.

4. The wireless-communication apparatus as claimed in claim 1, wherein the switchable antenna-coupler further comprises a phase-shifting circuit for providing, in the second antenna-coupling state, a phase shift between the second antenna element and signal ground.

5. A method of providing antenna-gain diversity with a first and a second antenna element which are electromagnetically coupled, the method comprising the step of switching a switch between:
   a first antenna-coupling state in which the first and the second antenna element are electrically coupled to an antenna-signal node;
   a second antenna-coupling state in which the first antenna element is electrically coupled to the antenna-signal node and the
   second antenna element is electrically coupled to signal ground said switch having a first and a second terminal, the first terminal being electrically coupled to the second antenna element and a coupling circuit, the second terminal being electrically coupled to the signal ground;
   said coupling circuit being between the antenna-signal node and the first terminal of the switch for preventing a signal, which may be present at the antenna-signal node, from substantially flowing to the signal ground via the switch.

* * * * *